Jan. 7, 1969    T. GARBER ET AL    3,421,106
DIFFERENTIAL FREQUENCY TRANSDUCER
Filed Oct. 3, 1967    Sheet 1 of 2

INVENTORS
Thomas Garber
David E. Kelch
Arthur Miller
BY
Mortenson and Weigel
ATTORNEYS

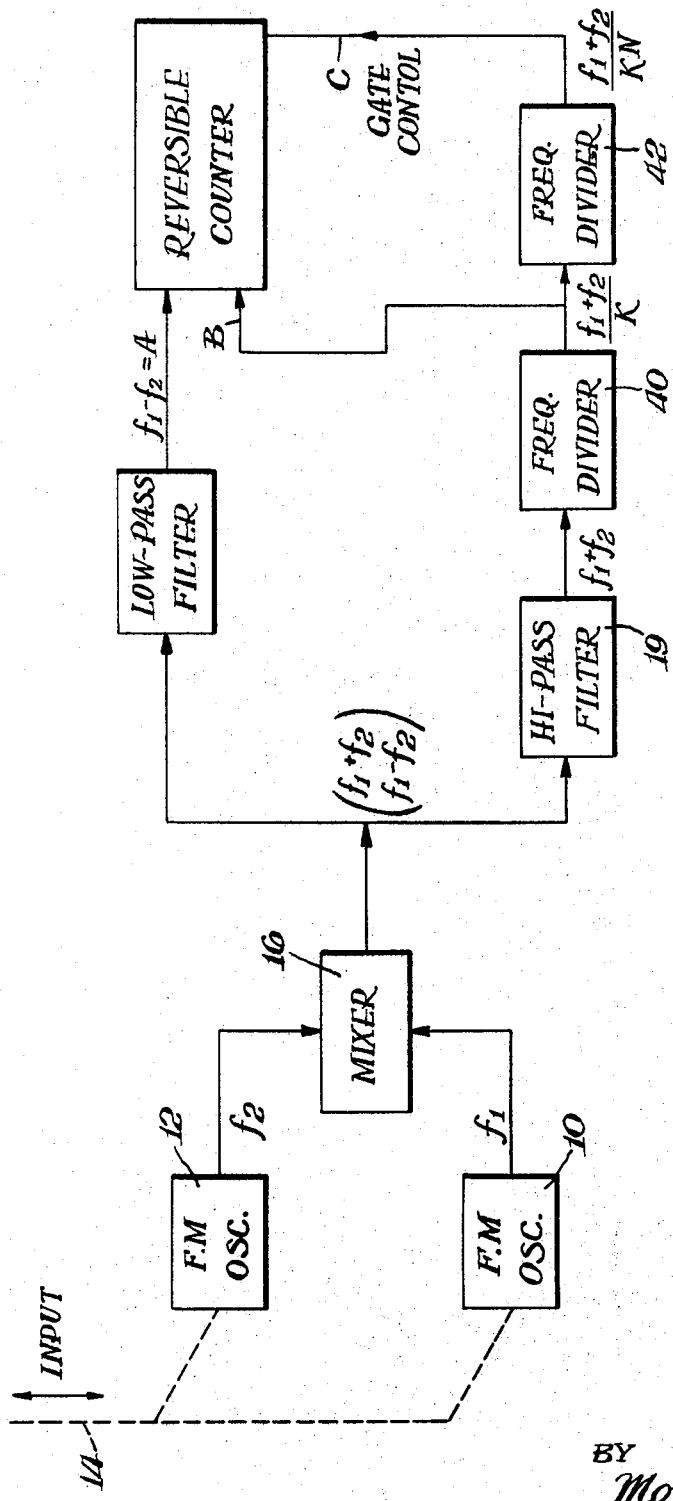

United States Patent Office 3,421,106
Patented Jan. 7, 1969

3,421,106
DIFFERENTIAL FREQUENCY TRANSDUCER
Thomas Garber, Framingham, Arthur Miller, Chestnut Hill, and David E. Kelch, Lexington, Mass., assignors to Hewlett-Packard Company, Palo Alto, Calif., a corporation of California
Filed Oct. 3, 1967, Ser. No. 672,599
U.S. Cl. 331—40
Int. Cl. H03b 21/00
14 Claims

ABSTRACT OF THE DISCLOSURE

An input stimulus acts to vary oppositely the frequency of two separate frequency modulated oscillators. The outputs of the oscillators are mixed to yield sum and difference frequencies. A counter counts the difference frequency over a time interval which is varied in accordance with the sum frequency. The total count is representative of the input signal.

---

Figure 1:
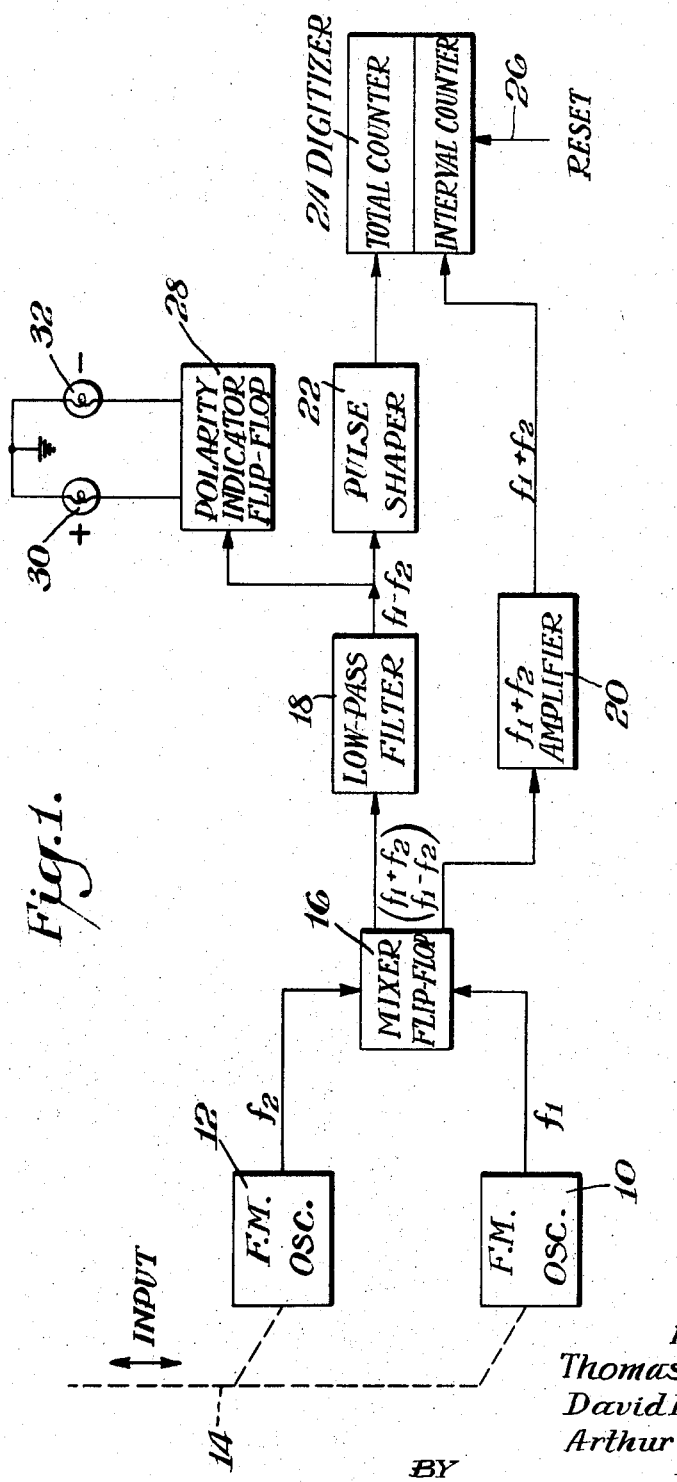

This invention relates to a transducer and, more particularly, to a transducer for converting an input stimulus into digital signals representing the sense and magnitude of the input signal.

Many transducers have been developed over the years for converting physical input signals representing such variables as displacement, temperature, pressure, and the like into electrical output signals. In a typical frequency modulated type transducer, a variable frequency oscillator converts a mechanical displacement having a particular sense or direction to an electrical signal varying in frequency in accordance with the magnitude and sense of the mechanical displacement. Other transducers produce an output, the amplitude of which is modulated in accordance with any input signal, whether electrical or mechanical. One problem typically encountered in many of these transducers is that the amplitude and frequency of the excitation signal as well as other circuit parameters tend to vary with temperature, line voltage changes, humidity, etc.

These transducers are often located at some remote sensing point and are connected to a central station through a cable. The cable often supplies the excitation power to the transducer and, in addition, transmits the modulated information signal from the transducer. Such cable connections are unfortunate since they only add to the problems encountered with such transducers. For example, an amplitude modulated information signal often is degraded by the cable itself. Further, the cable shunt capacitance can cause phase shifts; cable resistance and connector resistance and other changes in system resistance can vary the output signal. If the excitation power is in the same cable, the excitation signal can become cross-coupled to the output. Hence, the response or transfer function of the transducer varies.

Many of these difficulties have been alleviated by using a differential type FM transducer. Such transducers have two similarly constructed oscillators whose outputs are frequency modulated in accordance with the physical input signal. Differential operation is preferred and may be had by coupling the physical input signal to each oscillator in such a manner that the frequency of one is increased and that of the other decreased in equal amounts by the same input signal. The outputs of the oscillators are beat together to yield sum and difference frequencies. In this case, the difference frequency corresponds to the magnitude of the physical input signal and the sense of the difference frequency to the sense of the input signal. If the two oscillators are sufficiently alike in their response characteristics, the frequency shifts caused by environmental factors common to both oscillators, such as temperature, humidity, line voltage changes, etc. tend to be equal and of the same sense. Many of the problems encountered with the prior art analog type transducers are obviated.

Unfortunately, however, these common frequency shifts often result in a change in sensitivity of the transducer. The sensitivity of these transducers is defined for the purposes of this invention as the change in output difference frequency per unit change of the physical input signal. Desirably this change or frequency should remain constant for a unit change of input signal. In practice the sensitivity varies, resulting in inaccuracies.

Accordingly, it is an object of this invention to obviate many of the disadvantages inherent in the prior art analog and single oscillator type F.M. transducers.

Another object of this invention is to provide an improved differential frequency transducer in which changes in sensitivity due to common frequency shifts occuring in the transducer are reduced.

In a preferred embodiment of the invention a signal from a physical input variable such as temperature, humidity, pressure, etc. may be coupled to independently control the frequencies of separate but similarly constructed oscillators. The coupling is such that it varies the frequencies of the two oscillators in like amounts but in opposite senses. The outputs of each oscillator are mixed to yield sum and difference frequencies. The magnitude of the difference frequency signal corresponds to the magnitude of the physical input signal and the sense of the frequency difference corresponds to the sense of the physical input signal. By measuring or counting the difference frequency over a time interval determined by the sum frequency present in the mixed output signal, the changes in sensitivity of the transducer are substantially reduced.

The novel features that are considered characteristic of this invention are set forth with particularity in the appended claims. The invention, itself, however, both as to its organization and method of operation, as well as additional objects and advantages thereof, will best be understood from the following description when read in connection with the accompanying drawings, in which:

FIGURE 1 is a block diagram of a differential frequency transducer constructed in accordance with this invention, and FIGURE 2 is a block diagram of a differential frequency transducer constructed in accordance with a second embodiment of this invention.

In the drawing there are seen first and second frequency modulated oscillators 10 and 12 which provide output signals $f_1$ and $f_2$ respectively. Each of the oscillators 10 and 12 are of conventional design and may have a reactive element (not shown) which is actuated or varied in value in accordance with an input signal. The input signal is coupled to the reactive element of each oscillator by a suitable linkage denoted here as mechanical by the dashed line 14. The input signal, denoted "input" in the drawing, may be derived from any sensor such as a bimetal temperature sensing element, a Bourdon pressure gauge, etc., which senses the condition of an input variable. The reactive elements may be either inductive or capacitive. For that matter the input signal need not be of a mechanical nature at all. It may be a voltage which is applied to a variable capacitance junction diode acting as the reactance element of the oscillators 10, 12.

In any event, the illustrated mechanical linkage 14 couples the input signal to the respective reactive elements such that the frequencies of the oscillators 10, 12 are controlled by the value of the reactance exhibited by the reactive element and hence by the magnitude and sense of the input signal. The linkage 14 is designed such that the physical input signal causes the frequencies of the two oscillators to vary in opposite senses with respect to each other and by equal amounts. Thus, if the frequency of the first oscillator 10 decreases in accordance with a given input signal of a predetermined sense and magnitude, the frequency of the second oscillator 12 will increase by an equal amount. The frequency modulated signals $f_1$ and $f_2$ from the first and second oscillators 10 and 12, respectively, are connected to a mixer 16 which uses a flip-flop in its design. The mixer 16, as is normally understood by the term, combines the two signals $f_1$ and $f_2$ to yield sum and difference frequencies $f_1+f_2$ and $f_1-f_2$ respectively.

The output of the mixer 16, is coupled to a low pass filter 18 and a tuned sum frequency amplifier 20. The low pass filter 18 may be of a conventional design. For oscillators 10, 12 having a normal frequency, in the absence of an input signal, of say 50 kilocycles (kc.), a low pass filter having a high frequency cutoff frequency of 20 kc. could be used so that only the difference frequency $f_1-f_2$ from the mixer 16 is permitted to pass. In like manner, the tuned sum frequency amplifier 20 is a conventional amplifier tuned to sum frequency about 100 kc., such that only the sum frequency from the mixer 16 is allowed to pass and be amplified.

The difference frequency from the low pass filter 18 is coupled to a pulse shaper 22 which may be nothing more than a monostable multivibrator triggered by the difference frequency signal. The output pulses from the pulse shaper 22 are coupled to a digitizer 24. The digitizer 24 may comprise two separate counters, a total counter and an interval counter, both having separate reset inputs 26 which reset the counters to zero. The interval counter derives its input from the sum frequency amplifier 20. On the other hand, the total counter derives its input from the pulse shaper 22 which in essence passes the difference frequency signals. The counting interval for the total counter is determined by the interval counter's attaining a preset count. For example, the interval counter may control a gate (not shown) which passes the difference frequency signals to the total counter only while the interval counter is counting. When the interval counter achieves a predetermined count, the gate opens and no additional pulses pass to the total counter. The total in the total counter is displayed and the digitizer recycles. Counters capable of performing the function of the digitizer 24 are available commercially. One such counter is the Model No. 5233L available from the Hewlett-Packard Company, Palto Alto, Calif.

The output signals $f_1$ and $f_2$ from the respective oscillators 10 and 12 are coupled through blocks 16 and 18 to a polarity indicator flip-flop 28 which displays the sense of the change or deviation from the center frequency of the difference frequency signal, i.e., is the sense of the difference frequency $(\Delta f)$ positive or negative. A suitable circuit for use in the polarity indicator circuit which includes the junction of blocks 16, 18 and 28 for use with this invention is described in a letter published on page 435 of the March 1966 issue of the "Proceedings of the IEEE" and entitled "Frequency Selective Circuits for a Microelectronic FSK Receiver." In this circuit the $f_0$ input is supplied by the $f_1$ output of the first oscillator 10 and the $f_0 \pm \Delta f$ input is supplied by the $f_2$ output of the second oscillator 12. The "zero" and "one" outputs 1 and 0 of the polarity indicator flip-flop 28 each contain a lamp designated 30, 32 which are selectively excited by the set or reset condition of the output flip-flop 28. The two lamps 30 and 32 indicate whether the sense of the input signal change is in a postive-going direction or a negative-going direction as denoted by the plus and minus signs in the drawing.

When it is desired to sense the magnitude and direction of some input signal, a reset signal is applied at the reset input 26 of the digitizer 24 such that both the total and interval counter are reset to zero. In the absence of an input signal, both of the first and second oscillators 10 and 12, respectively, have the same reference frequency such that their outputs $f_1$ and $f_2$ are equal. When mixed, the difference frequency is zero; hence the total counter in the digitizer 24 receives no input and indicates the zero input signal.

On the other hand, suppose the input signal had been increasing in magnitude and in such a direction that the frequencies of the first and second oscillators 10 and 12, respectively, would be increased and decreased, respectively, by like amounts. That is to say if the initial frequency of each oscillator was 50 kilocycles per second (kc.) the frequency $f_1$ would be increased. If the input signal was 10% of the operating range or band of the transducer, $f_1$ would increase to 55 kilocycles and the second oscillator output frequency $f_2$ would decrease by a like amount to 45 kilocycles. The two frequencies $f_1$ and $f_2$ are then mixed in the mixer 16 and the resulting difference frequency signal passed through the low pass filter 18 and the pulse shaper 22 to the total counter in the digitizer 24. The total counter counts the difference frequency signal for an interval of time determined by the interval counter. The interval counter permits the gate to the total counter to stay open and to count until the inital counter achieves a predetermined count. The predetermined count is established as a function of the sum frequency signal. If the predetermined count is set as 100,000 and the sum frequency $(f_1+f_2)$ is 100 kc., then the time interval is one second. The polarity flip-flop positive light 30 illuminates indicating that the sense of the physical input signal was positive, since $f_1$ was greater than $f_2$. Both counters are now reset to zero for the next count cycle.

This arrangement has several advantages. Firstly, by using similarly constructed oscillators, frequency shifts caused by environmental factors that are common to both oscillators such as temperature, humidity, power voltage changes, etc. tend to be equal and in the same sense so that any resulting frequency differences will be appreciably reduced. Unfortunately, however, these frequency shifts may result in changes in the sensitivity of the transducer. Stated in another manner, these frequency shifts result in a situation wherein an input signal of given magnitude will produce a greater or lesser frequency change than should be the case. By using the sum frequency signal as a time reference, these changes in sensitivity may be greatly reduced.

This may be perhaps more easily understood by an example. Assume that the same input signal produces the 5 kc. frequency change in the oscillators which have a nominal frequency of 50 kc. Under these conditions, the first oscillator frequency $f_1$ is 55 kc. and the second oscillator frequency $f_2$ equals 45 kc. With these frequencies, the difference frequency $f_1-f_2$ is 10 kc. and the sum frequency $f_1+f_2$ is 100 kc. Under normal conditions, the assumed input signal yields a difference frequency of 10 kc. If now, due to drift or other deleterious conditions there is a common frequency increase in each oscillator of 1 kc., the same input signal causes the first oscillator frequency $f_1$ to reach 56.1 kc. [(51+5.1)=56.1] and the second oscillator frequency $f_2$ to equal 45.9 kc. With these new drift affected frequencies, the difference frequency $f_1-f_2$ is now 10.2 kc. and the sum frequency $f_1+f_2$ is now 102 kc. There is thus seen to be a 2% error of 200 cycles in the difference frequency signal. The difference frequency should be 10 kc. rather than 10.2 kc. There has been an increase in sensitivity of the transducer due to the common change in oscillator frequency.

In accordance with this invention, however, instead of a count interval as determined by the time it requires the interval counter to count the sum frequency of 100 kc. the sum frequency is now 102 kc. such that the same count is reached faster. Stated in another way, the count interval is decreased by approximately 2% such that the total counter will measure an equivalent difference frequency of 10 kc. and not 10.2 kc. The effect then of sensitivity changes caused by a frequency shift has thus been substantially eliminated. The operation is much the same for negative-going input signals hence no further description is deemed necessary.

The two oscillators 10 and 12 can be adjusted, if desired, such as by adjustment of the linkage 14, to produce an initial finite frequency difference corresponding to the condition of zero input signal or stimulus to the transducer. When an input signal or stimulus is applied to the transducer in one sense, this frequency difference is increased, while a reversal of the sense of the stimulus will reduce the difference. If the initial difference is made large enough, then over the working range of the transducer, the difference frequency will never go through zero.

This avoids the tendency of two oscillators in a single instrument to lock together at a common frequency when the difference between them becomes small. By proper care in design, this tendency can be minimized, but the problem can be avoided by starting with a relatively large initial frequency difference. When, however, one chooses this technique based on a large initial difference, the read out system needs to be different from that shown in FIG. 1.

One preferred embodiment is shown in FIG. 2. The outputs of the two oscillators 10 and 12, respectively, are combined in the mixer 16 whose output thus contains both sum and difference components as described previously. These sum and difference frequency components are separated by a high pass filter 19 and the low pass filter 18. The low frequency component, $f_1-f_2$, is designated A. When the stimulus to the transducer is zero, A will have some finite initial value, $A_0$.

As a numerical example, we might choose:

$$f_1=55 \text{ kc.}+\Delta f$$
$$f_2=45 \text{ kc.}-\Delta f$$
$$A_0=10 \text{ kc.}$$
$$f_1+f_2=100 \text{ kc.}$$

If a positive going stimulus increases $f_1$ and decreases $f_2$, then A will rise above its initial 10 kc. value. Conversely, a negative going stimulus would decrease $f_1$, increase $f_2$, and make A drop below its initial 10 kc. value.

The sum frequency component passes through first and second frequency dividers 40 and 42, respectively, which have ratios of K and N respectively. (It is understood that, to achieve these ratios each of the boxes 40 and 42 may contain a cascade of individual divider circuits or other conventional circuitry.) The output of the first divider 40, $$\frac{f_1+f_2}{K}$$

is labeled the B signal in FIG. 2. The second divider output 42, $$\frac{f_1+f_2}{KN}$$

is labeled C and constitutes the gate control signal for a reversible counter, such as the Hewlett-Packard Model 5280. This reversible counter will count the difference between the difference frequency A and the sum frequency divided by the factor K, i.e., the signal B, for a period of time established by the gate control signal C. In our case this period could be $$\frac{NK}{f_1+f_2}$$

The count which is displayed by the counter, therefore is $$(A-B)\cdot\frac{NK}{f_1+f_2}$$

When the difference frequency A exceeds the B signal frequency, the counter displays a plus sign in front of the rows of digits, and when the B signal exceeds the A signal, the counter displays a negative sign. In this manner one can determine the polarity of the input signal or stimulus.

To continue with our numerical example, we could choose K to be 10, while N is made 1000. For these constants, B becomes 100 kc./K or 10 kc., and the factor $$\frac{NK}{f_1+f_2}$$

becomes $$\frac{10^4}{f_1+f_2}=0.1 \text{ second}$$

At zero input to the transducer, both A and B would be 10 kc., i.e., $A+f_1-f_2=55-45=10$ kc. and $$B=\frac{f_1+f_2}{10}=\frac{55+45}{10}=10 \text{ kc.}$$

and the counter would display zero. As the stimulus to the transducer approaches full scale in one sense, $f_1$ increases to 60 kc., $f_2$ decreases to 40 kc., A rises to 20 kc., B would not change, and the counter counts $A-B$, or a 10,000 cycle frequency for 0.1 second, giving a reading of +1000. Conversely as the input signal varies in negative going sense, $f_1$ and $f_2$ both approach 50 kc., A approaches zero, and the counter again counts a 10 kc. signal for 0.1 second for a reading of 1000, but since B now exceeds A, the sign would be negative (−).

If, in the example, changes in environmental conditions had shifted, the initial frequencies of the $f_1$ and $f_2$ oscillators, there would have been corresponding percentage changes in all three quantities A, B, and C, which are applied to the counter, and the counter reading is not disturbed.

There has thus been described a relatively simple differential frequency transducer which is relatively stable and substantially immune to the normal effects of changes in circuit parameters. The transducer can accommodate virtually any type of input signal, be it electrical or mechanical, which acts to frequency modulate the input oscillators in opposite senses.

It is obvious that many embodiments may be made of this inventive concept, and that many modifications may be made in the embodiments hereinbefore described. Therefore, it is to be understood that all descriptive matter herein is to be interpreted merely as illustrative, exemplary, and not in a limited sense. It is intended that the various modifications which might readily suggest themselves to those skilled in the art be covered by the following claims, as far as the prior art permits.

What is claimed is:
1. A transducer for converting an input signal into digital signals representing the magnitude of said input signal comprising:
   first and second frequency modulated oscillators for producing respective first and second output signals,
   means for varying the frequency of said first oscillator in a first sense in accordance with said input signal,
   means for varying the frequency of said second oscillator in a second sense opposite to said first sense in accordance with said input signal,
   mixing means coupled to each of said oscillators to produce sum and difference frequency signals from said first and second output signals, and
   means controlled by the frequency of said sum frequency signals for determining the frequency of said difference frequency signals.

2. A transducer according to claim 1 wherein said means for determining the frequency of said difference signals includes a first counter responsive to said difference frequency signals for counting each cycle thereof.

3. A transducer according to claim 2 wherein said means for determining the frequency of said difference frequency signals includes means responsive to said sum frequency signals for controlling the time interval over which said first counter counts.

4. A transducer according to claim 3 wherein said means for controlling the time interval comprises a second counter coupled to said mixing means.

5. A transducer according to claim 1 wherein said means for determining the frequency of said difference frequency signals includes means coupled to said mixing means for producing digital signals indicative of said difference frequency.

6. A transducer according to claim 1 which also includes means responsive to said difference frequency signals for determining the sense of said physical input signal.

7. A transducer according to claim 6 wherein said means for determining the frequency of said difference frequency signals includes means coupled to said mixing means for producing digital signals indicative of said difference frequency.

8. A transducer according to claim 7 in which a low pass filter having a cutoff frequency for passing substantially only said difference frequency signals, is coupled between said mixing means and said means for producing digital signals.

9. A transducer according to claim 8 which also includes a high pass circuit having a lower cutoff frequency for passing substantially only said sum frequency signals, coupled between said mixing means and said means for producing digital signals.

10. A transducer according to claim 9 wherein said means for determining the frequency of said difference signals includes
 a first counter responsive to said difference frequency signals for counting each cycle thereof,
 said means for determining the frequency of said difference frequency signals includes means responsive to said sum frequency of said signals for controlling the time interval over which first counter counts.

11. A transducer according to claim 1 wherein each of said means for varying the frequencies of said first and second oscillators is adjustable to prevent said difference frequency signals from passing through zero over the operating range of said input signal.

12. A transducer according to claim 1 wherein said last named means determines the frequency difference between said difference frequency signals and said sum frequency signals.

13. A transducer according to claim 11 wherein said last named means determines the frequency difference between said difference frequency signals and said sum frequency signals.

14. A transducer according to claim 11 which also includes means for varying said sum frequency signal by a factor, and said last named means determines the frequency difference between said difference frequency signals and said sum frequency signals multiplied by a factor.

References Cited
UNITED STATES PATENTS

| | | | |
|---|---|---|---|
| 2,421,771 | 6/1947 | Browning | 331—37 |
| 3,296,549 | 1/1967 | Johnson | 331—4 |

ROY LAKE, *Primary Examiner.*

S. H. GRIMM, *Assistant Examiner.*

U.S. Cl. X.R.

331—48, 65